US012041038B2

United States Patent
Jarman et al.

(10) Patent No.: US 12,041,038 B2
(45) Date of Patent: *Jul. 16, 2024

(54) CONSUMER-AUTHORIZED CONTROLLED DISTRIBUTION OF TRUSTED SOURCE DATA

(71) Applicant: Turbopass Corporation, Helotes, TX (US)

(72) Inventors: Kenneth Jarman, San Antonio, TX (US); Michael Jarman, San Antonio, TX (US)

(73) Assignee: TURBOPASS CORPORATION, Helotes, TX (US)

( * ) Notice: Subject to any disclaimer, the term of this patent is extended or adjusted under 35 U.S.C. 154(b) by 372 days.

This patent is subject to a terminal disclaimer.

(21) Appl. No.: 17/444,040

(22) Filed: Jul. 29, 2021

(65) Prior Publication Data

US 2021/0359982 A1 Nov. 18, 2021

Related U.S. Application Data

(63) Continuation of application No. 16/294,725, filed on Mar. 6, 2019, now Pat. No. 11,115,392.
(Continued)

(51) Int. Cl.
*H04L 29/06* (2006.01)
*G06Q 40/03* (2023.01)
(Continued)

(52) U.S. Cl.
CPC ......... *H04L 63/0435* (2013.01); *G06Q 40/03* (2023.01); *H04L 9/088* (2013.01); *H04L 63/0807* (2013.01)

(58) Field of Classification Search
CPC . H04L 63/0435; H04L 9/088; H04L 63/0807; H04L 9/3226; H04L 63/10; H04L 9/0894; G06Q 40/03
See application file for complete search history.

(56) References Cited

U.S. PATENT DOCUMENTS 6,587,841 B1 7/2003 DeFrancesco et al.
8,417,723 B1 * 4/2013 Lissack ................. G06F 21/335
707/781
(Continued)

FOREIGN PATENT DOCUMENTS

CN 106341429 A * 1/2017 ......... H04L 63/0807
CN 107979590 A * 5/2018 ......... G06F 21/6209
(Continued)

OTHER PUBLICATIONS

Day 1 Certainty AccountChek VOA Sample Report, AccountChek, n.d. [online], [retrieved on Feb. 27, 2019]. Retrieved from the Internet http://www.eprmg.net/ResourceCenter/PoliciesProceduresInformation/Day1CertaintyAccountChekVOASampleReport.pdf.
(Continued)

*Primary Examiner* — Sher A Khan
(74) *Attorney, Agent, or Firm* — Thompson Patent Law Offices PC

(57) ABSTRACT

Apparatus and associated methods relate to a 3rd Party Asset Verification module (3PAV module) embodied in a computer system configured to: (1) transmit a unique access code to at least one entity, the unique access code (1a) associated with a user and the user's asset information, and (1b) permits access to the user's asset information stored in the controlled access data store, and (2) in response to a request for data from a broadcasted receiver of the unique access code, the request including the unique access code, returning the user's asset information stored in the controlled access data store. In an illustrative example, the unique code may be generated upon the user providing authorization, over a network, for other parties to access the user's asset information. Various implementations may provide for secure and controlled access to the user's trusted asset data, which
(Continued)

may increase efficiency in a consumer-dealer-lender transaction.

21 Claims, 11 Drawing Sheets

Related U.S. Application Data

(60) Provisional application No. 62/814,546, filed on Mar. 6, 2019, provisional application No. 62/639,673, filed on Mar. 7, 2018.

(51) Int. Cl.
*H04L 9/08* (2006.01)
*H04L 9/40* (2022.01)

(56) References Cited

U.S. PATENT DOCUMENTS

| | | | |
|---|---|---|---|
| 8,555,079 B2 | 10/2013 | Shablygin et al. | |
| 8,725,657 B2* | 5/2014 | Jarman | G07F 15/003 705/412 |
| 8,762,243 B2 | 6/2014 | Jenkins et al. | |
| 8,812,860 B1 | 8/2014 | Bray | |
| 9,256,904 B1* | 2/2016 | Haller | G06F 18/00 |
| 9,342,783 B1 | 5/2016 | Chang et al. | |
| 9,565,175 B1* | 2/2017 | Saylor | G06F 21/10 |
| 9,628,475 B2* | 4/2017 | Gupta | H04L 63/107 |
| 9,800,580 B2* | 10/2017 | Zhang | H04L 63/0807 |
| 9,843,572 B2* | 12/2017 | Rykowski | H04L 63/0823 |
| 10,212,143 B2* | 2/2019 | Allain | H04L 63/08 |
| 11,429,966 B1* | 8/2022 | Adam | G06Q 20/401 |
| 2002/0128945 A1 | 9/2002 | Moss et al. | |
| 2003/0167178 A1* | 9/2003 | Jarman | G06Q 20/4016 705/412 |
| 2006/0112424 A1* | 5/2006 | Coley | H04L 63/0227 726/11 |
| 2010/0004999 A1 | 1/2010 | DePetris et al. | |
| 2010/0042478 A1 | 2/2010 | Reisman | |
| 2011/0030047 A1* | 2/2011 | Gao | H04W 12/068 726/28 |
| 2011/0078774 A1* | 3/2011 | Grube | G06Q 20/40 726/5 |
| 2011/0225643 A1* | 9/2011 | Faynberg | G06F 21/31 726/10 |
| 2013/0036455 A1* | 2/2013 | Bodi | H04L 63/0807 726/4 |
| 2013/0110655 A1* | 5/2013 | Biafore | G06Q 40/00 705/16 |
| 2014/0129448 A1 | 5/2014 | Aiglstorfer | |
| 2015/0092233 A1* | 4/2015 | Park | H04N 1/00244 358/1.15 |
| 2016/0094991 A1* | 3/2016 | Powell | H04W 12/37 455/411 |
| 2016/0352751 A1* | 12/2016 | Perrufel | H04L 63/123 |
| 2017/0006016 A1* | 1/2017 | Addala | H04L 63/102 |
| 2017/0070500 A1 | 3/2017 | Hockey et al. | |
| 2017/0163617 A1* | 6/2017 | Laxminarayanan | G07C 9/30 |
| 2017/0302635 A1* | 10/2017 | Humphries | H04L 51/08 |
| 2018/0060596 A1* | 3/2018 | Hamel | H04L 9/088 |
| 2018/0082371 A1 | 3/2018 | Chandler | |
| 2018/0191697 A1* | 7/2018 | Ghafourifar | H04L 63/10 |
| 2018/0227128 A1* | 8/2018 | Church | H04L 9/3247 |
| 2018/0268159 A1 | 9/2018 | Yu | |
| 2018/0332042 A1 | 11/2018 | Yu et al. | |

FOREIGN PATENT DOCUMENTS

| | | | | |
|---|---|---|---|---|
| EP | 2498472 A1 * | 9/2012 | | H04L 63/0853 |
| EP | 2643955 B1 * | 8/2016 | | G06F 21/31 |
| GB | 2151061 A * | 7/1985 | | G06Q 20/04 |
| JP | 2004110335 A * | 4/2004 | | |
| JP | 4811123 B2 * | 11/2011 | | |
| JP | 2018014099 A * | 1/2018 | | G06F 21/31 |
| WO | WO-2011015885 A1 * | 2/2011 | | H04L 12/2898 |
| WO | WO-2011075825 A1 * | 6/2011 | | G06F 21/6218 |
| WO | WO-2016014964 A1 * | 1/2016 | | G06F 19/3456 |

OTHER PUBLICATIONS

Digital Lending, digitallending.com, n.d. [online], [retrieved on Feb. 27, 2019]. Retrieved from the Internet https://www.digitallending.com/.

Finicity, Finicity Reports, Finicity.com, n.d. [online], [retrieved on Feb. 27, 2019]. Retrieved from the Internet https://www.finicity.com/finicityreports/.

FormFree, AccountChek, FormFree.com, n.d., [online], [retrieved on Feb. 27, 2019]. Retrieved from the Internet https://www.formfree.com/accountchek/.

FormFree, Borrower Overview, 2017 [online], [retrieved on Feb. 27, 2019]. Retrieved from the Internet https://resourcecenter.formfree.com/downloads/Borrower%20Overview.pdf.

FormFree, FormFree Announes Strategic Partnership With Financial Apps, formfree.com, Oct. 16, 2015 [online], [retrieved on Feb. 27, 2019]. Retrieved from the Internet https://www.formfree.com/2015/10/16/formfree-announes-strategic-partnership-with-financial-apps/.

FormFree, The future of digital lending: Company Training, 2017 [online], [retrieved on Feb. 27, 2019]. Retrieved from the Internet https://resourcecenter.formfree.com/downloads/AccountChek_dashboard_training_copyright%20(1).pdf.

United States Court of Appeals for the Federal Circuit, *Clarilogic, Inc.*, v. *Formfree Holdings Corporation*, Mar. 15, 2017, 8 pages, [online], [retrieved on Feb. 15, 2018]. Retrieved from the Internet http://www.cafc.uscourts.gov/sites/default/files/opinions-orders/16-1781.Opinion.3-13-2017.1.PDF.

* cited by examiner

CONSUMER-AUTHORIZED CONTROLLED DISTRIBUTION OF TRUSTED SOURCE DATA

CROSS-REFERENCE TO RELATED APPLICATIONS

This application is a Continuation of and claims the benefit of U.S. application Ser. No. 16/294,725, titled "Consumer-Authorized Controlled Distribution of Trusted Source Data," filed by Kenneth Jarman, et al., on Mar. 6, 2019, which application claims the benefit of U.S. Provisional Application Ser. No. 62/639,673, titled "Consumer-Authorized Controlled Distribution of Trusted Source Data," filed by Kenneth Jarman, et al., on Mar. 7, 2018 and also claims the benefit of U.S. Provisional Application Ser. No. 62/814,546, titled "Graphical User Interfaces (GUIs) for Displaying Trusted Source Data," filed by Michael Jarman, et al., on Mar. 6, 2019.

This application incorporates the entire contents of the foregoing application(s) herein by reference.

TECHNICAL FIELD

Various embodiments relate generally to truthful asset verification.

SUMMARY

Apparatus and associated methods relate to a $3^{rd}$ Party Asset Verification module (3PAV module) embodied in a computer system configured to: (1) transmit a unique access code to at least one entity, the unique access code (1a) associated with a user and the user's asset information, and (1b) permits access to the user's asset information stored in the controlled access data store, and (2) in response to a request for data from a broadcasted receiver of the unique access code, the request including the unique access code, returning the user's asset information stored in the controlled access data store. In an illustrative example, the unique code may be generated upon the user providing authorization, over a network, for other parties to access the user's asset information. Various implementations may provide for secure and controlled access to the user's trusted asset data, which may increase efficiency in a consumer-dealer-lender transaction.

Various embodiments may achieve one or more advantages. For example, some embodiments may advantageously provide a lender with the consumer's income and asset information by requesting permission from the consumer to securely collect their income and asset data and communicate that data to the lender(s). With accurate and truthful income and asset information, the lender will be able to offer a more informed, accurate, and competitive financing bid in the seller of goods' credit sale. A 3PAV module that electronically and dynamically provides truthful and reliable consumer income and asset information to a lender may substantially mitigate or eliminate the lender being a victim of seller of goods fraud (e.g., it keeps the sellers of goods honest). The 3PAV module may also provide the seller of goods with reliable and truthful consumer income and asset information by requesting permission from the consumer to securely collect their income and asset data and communicate that data to the seller of goods. The 3PAV module may distribute a consumer's banking data file to sellers of goods and/or lenders at the time the consumer applies for financing, advantageously allowing for speedy, dynamic, and real-time processing of consumer financing applications.

The details of various embodiments are set forth in the accompanying drawings and the description below. Other features and advantages will be apparent from the description and drawings, and from the claims.

BRIEF DESCRIPTION OF THE DRAWINGS

FIG. 9 depicts a display screen including an exemplary graphical user interface (GUI) configured to interface with a user.

FIG. 10 depicts a display screen including an exemplary graphical user interface (GUI) configured to interface with a user.

FIG. 11 depicts a display screen including an exemplary graphical user interface (GUI) configured to interface with a user.

Like reference symbols in the various drawings indicate like elements.

DETAILED DESCRIPTION OF ILLUSTRATIVE EMBODIMENTS

Figure 1:
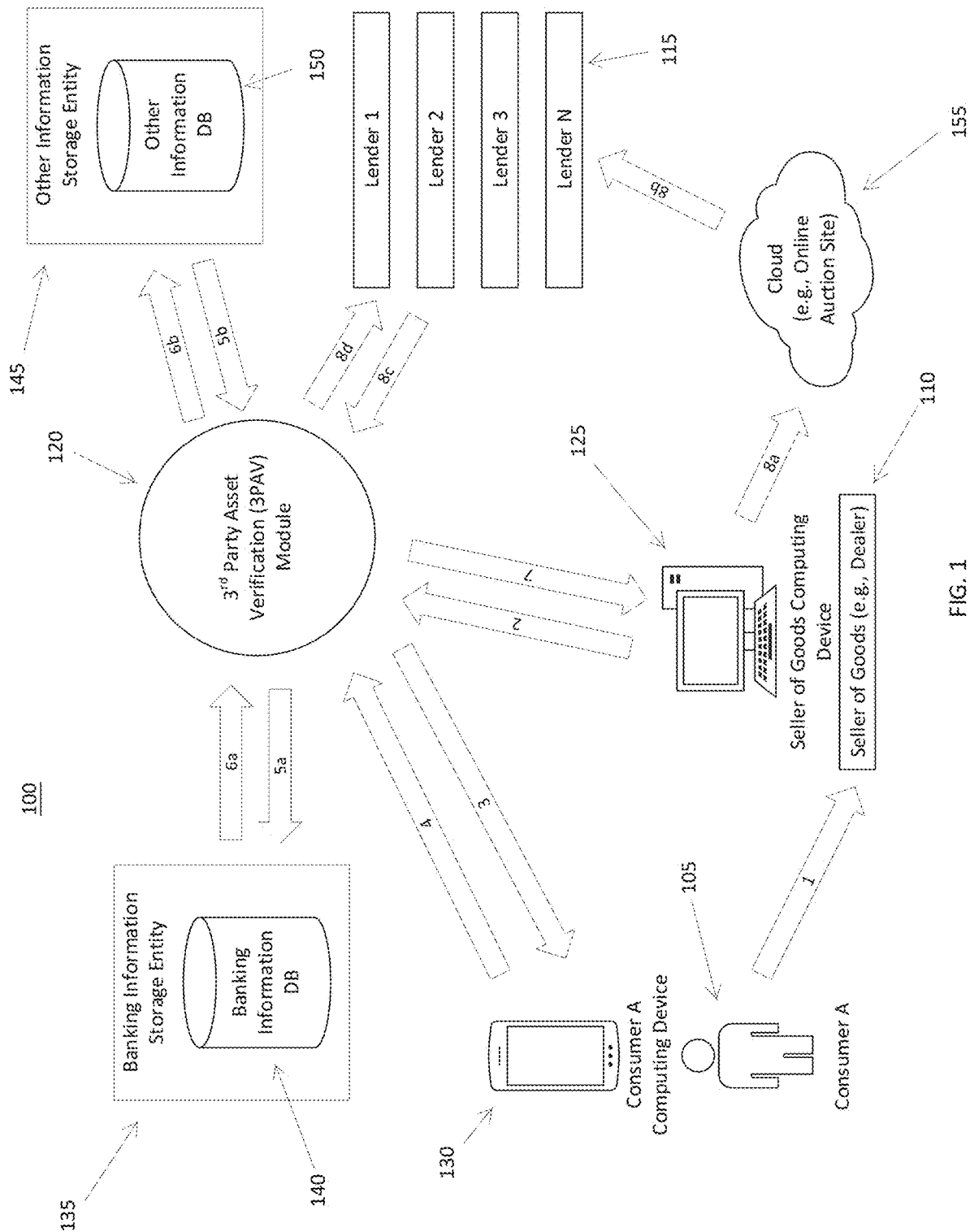
FIG. 1 depicts a block-diagram of an exemplary multi-party ecosystem including a consumer, a "seller of goods" (per the UCC Article 2) who offers sales financing in the form of "chattel paper" (as defined in UCC Article 9), multiple lenders (e.g., potential "assignees" of the chattel paper), and a $3^{rd}$ party asset verification (3PAV) module.

FIG. 1 depicts a block-diagram of an exemplary multi-party ecosystem 100 including a consumer, a "seller of goods" (per the UCC Article 2) who offers sales financing in the form of "chattel paper" (as defined in UCC Article 9), multiple lenders (e.g., potential "assignees" of the chattel paper), and a $3^{rd}$ party asset verification (3PAV) module. In an exemplary scenario, a consumer 105 (e.g., "Consumer A") initiates a purchasing process by engaging with a seller of goods 110 (e.g., an auto seller of goods). The seller of goods offers good for sale (e.g., boats, motorcycles, manufactured homes, cars/automobiles). The consumer desires to purchase one of the seller of goods' products. However, the consumer in this scenario does not have adequate monetary assets to purchase one of the products offered by the seller of goods outright. In order for the consumer to purchase one of the products being sold by the seller of goods, the seller of goods offers to extend credit (as a credit seller/creditor) to the consumer using a retail installment contract (RIC). A retail installment (sales) contract (RIC) is a conditional contract that requires that a third-party lender (a separate entity from the seller of goods acting as the first lender) to approve financing for the consumer (as a prospective purchaser/borrower) before the sale of the car is official.

To satisfy the conditions of the RIC, the seller of goods will have a "credit sale," where multiple lenders 115 bid on the financing for the consumer. Multiple lenders may provide financing services to the seller of goods offering to finance the debt for the consumer, thus allowing the consumer to acquire one of the products offered by the seller of goods on credit. Each lender may provide different financing offers (e.g., having different terms or rates) to the seller of goods. For example, a seller of goods may auction the RIC/"chattel paper" (as defined by UCC Article 9) for the consumer to the highest bidder (lender) via an auction site. However, the lenders are not able to generate a highly informed and customized financing offer because the lenders do not have accurate income and asset information for the particular consumer. The lender may receive some income and asset information from the seller of goods, but the lender has no way to verify that this information received from the seller of goods is correct (e.g., due to the chance of seller of goods fraud).

Accordingly, a $3^{rd}$ party asset verification module 120 (3PAV module) advantageously provides the lender with the consumer's income and asset information by requesting permission from the consumer to securely collect their income and asset data and communicate that data to the lender(s). With accurate and truthful income and asset information, the lender will be able to offer a more informed, accurate, and competitive financing bid in the seller of goods' credit sale. A 3PAV module that electronically and dynamically provides truthful and reliable consumer income and asset information to a lender may substantially mitigate or eliminate the lender being a victim of seller of goods fraud (e.g., it keeps the sellers of goods honest). The 3PAV module may also provide the seller of goods with reliable and truthful consumer income and asset information by requesting permission from the consumer to securely collect their income and asset data and communicate that data to the seller of goods. Accordingly, the 3PAV module may distribute a consumer's banking data file to sellers of goods and/or lenders at the time the consumer applies for financing, advantageously allowing for speedy, dynamic, and real-time processing of consumer financing applications. The result is that a lender's due diligence becomes "turnkey" (e.g., already ready for immediate use), saving the lenders money in the process.

The function of the 3PAV module may provide for an improved method of proving up a consumer's ability to pay. For example, traditionally lenders rely on scorecards based on information from seller of good (e.g., seller data inputs). In this situation, there may be a significant chance that the seller of goods will inflate the consumer's ability to pay. Consequently, lenders may make bids that price in the risk of a seller of goods inflating a consumer's income. The 3PAV module may advantageously and objectively validate a consumer's ability to pay by accessing their online banking information. Accordingly, the 3PAV module gives more transparency to a lender regarding a given consumer's ability to pay, which may result in lenders reflecting more appropriate finance pricing to the consumer.

In an illustrative process example, a purchase process starts with a consumer 105 (e.g., "Consumer A") going a seller of goods' place of business (e.g., a dealer showroom) and engaging with a seller of goods (Arrow 1). The consumer desires to purchase a product from the seller of goods 110. However, the consumer does not have the requisite assets needed to purchase the product, so the seller of goods proposes that the consumer purchase the product on credit. The consumer then gives their personal information (e.g., name, phone number, date of birth, social security number) to the seller of goods to determine the consumer's qualification for financing. The seller of goods now has "permissible purpose" to pull credit/banking/asset information, check the veracity of the consumer's stated income, and underwrite the deal.

Next, the seller of goods logs into a 3PAV module seller of goods interface (e.g., a web-based interface) using a seller of goods computer 125 (e.g., "Seller of Goods Computing Device"). Using the 3PAV module seller of goods interface, the seller of goods inputs various consumer identifying/contact information (e.g., name, phone number, email) associated with the consumer, which is transmitted to the 3PAV module (Arrow 2). The 3PAV module then sends an electronic message (e.g., in the form of a text message) to the consumer's electronic device 130 (e.g., "Consumer A Computing Device") associated with the consumer's identifying/contact information containing a web-link asking permission from the consumer to give the seller of goods (and/or prospective lenders) access to the consumer's income and asset data (Arrow 3). The consumer opens the web-link to a secure web interface and responds to the request by indicating that they give permission to access their asset information.

The consumer enters their bank account identifying information (e.g., the consumer's bank, routing number, account number, and/or online bank login username/password) in the secure web interface, which is securely transmitted to the 3PAV module (Arrow 4). Now that the 3PAV module has the consumer's bank account identifying information, the 3PAV module sends a data-pull request (Arrow 5a) to a banking information repository entity 135 requesting access to the consumer's banking data stored in a banking information database 140 (e.g., "Banking Information DB") and associated with the consumer's bank account identifying information. In some examples, the 3PAV module may query an application programming interface (API) of the banking information repository entity, which may provide the 3PAV module with secure access to the consumer's banking data. In response to the data-pull request, the banking information storage entity sends the consumer's banking data back to the 3PAV module (Arrow 6a). In various embodiments, the banking information storage entity may be a banking data aggregator that has access to various banking data repositories. In some examples, other data sources may be accessed by the 3PAV module. For example, the 3PAV module may send a data-pull request (Arrow 5b) to an "other" information storage entity 145 requesting access to other types of data (stored in other databases 150) associated with the consumer. In response, the "other" information storage entity may send other types of data associated with the consumer back to the 3PAV module (Arrow 6b). This type of data may be, for example, Lexis-Nexis identity data, liens/judgements data, and/or credit data. The 3PAV module will then store the received consumer's banking data (and optionally other data such as identity/lien/judgment/credit data) in computer memory storage, and process, manipulate, and/or curate the data into a structured data format (e.g., a PDF, XML, and/or JSON file).

Next, the 3PAV module generates a unique consumer code that is associated with the consumer's banking data, where the unique consumer code allows restricted access the consumer's banking data in a structured data format. Next, the 3PAV module gives the seller of goods access to the unique consumer code (Arrow 7). In some examples, the 3PAV module may send a consumer financial/banking data report to the seller of goods that has the unique consumer code embedded into the report. A seller of goods or lender that has the unique consumer code may utilize the code in an API request to the 3PAV module to receive the consumer's banking data in structured data format to determine the consumer's ability to pay. In some examples, the 3PAV module may send the consumer's banking data in a structured data format (e.g., in a XML or JSON file) in response to a valid API request. In various embodiments, the seller of goods (and/or lenders) may receive the consumer's banking data in a report format upon completion of the consumer authentication. For example, after a consumer has authenticated their banking credentials, the seller of goods may immediately access the consumer's banking data through a seller of goods (web interface) dashboard powered by the 3PAV module. The seller of goods may recall the "Verification of Assets Order" that is now "Complete," and choose to view or save a PDF report file.

In various embodiments, the seller of goods may send (Arrow 8*a*) the unique consumer code to a cloud server, which in some examples, may be an online auction platform/website 155. The online auction platform may then send a broadcast message to various lenders 115 (Arrow 8*b*), where the broadcast message contains the unique consumer code. In some examples, the seller of goods may choose which lenders receive the broadcast message. With the unique consumer code in hand, a lender may then send an API request containing the unique consumer code to the 3PAV module (Arrow 8*c*), requesting the consumer's financial/banking information. In response to a valid API request (e.g., containing a valid unique consumer code), the 3PAV module may respond to the lender by providing the lender with the associated consumer's banking data in a structured data format (e.g., an XML or JSON format). Having access to the consumer's asset data in structured data format may advantageously allow the lender to calculate a more accurate and customized financing offer for the seller of goods that takes into account the consumer's income and assets. Accordingly, the 3PAV module may give the lenders reliable income and asset information that they were previously unaware of, allowing the lenders to make a more informed decision about what type of financing offer to present to the seller of goods.

Figure 2:
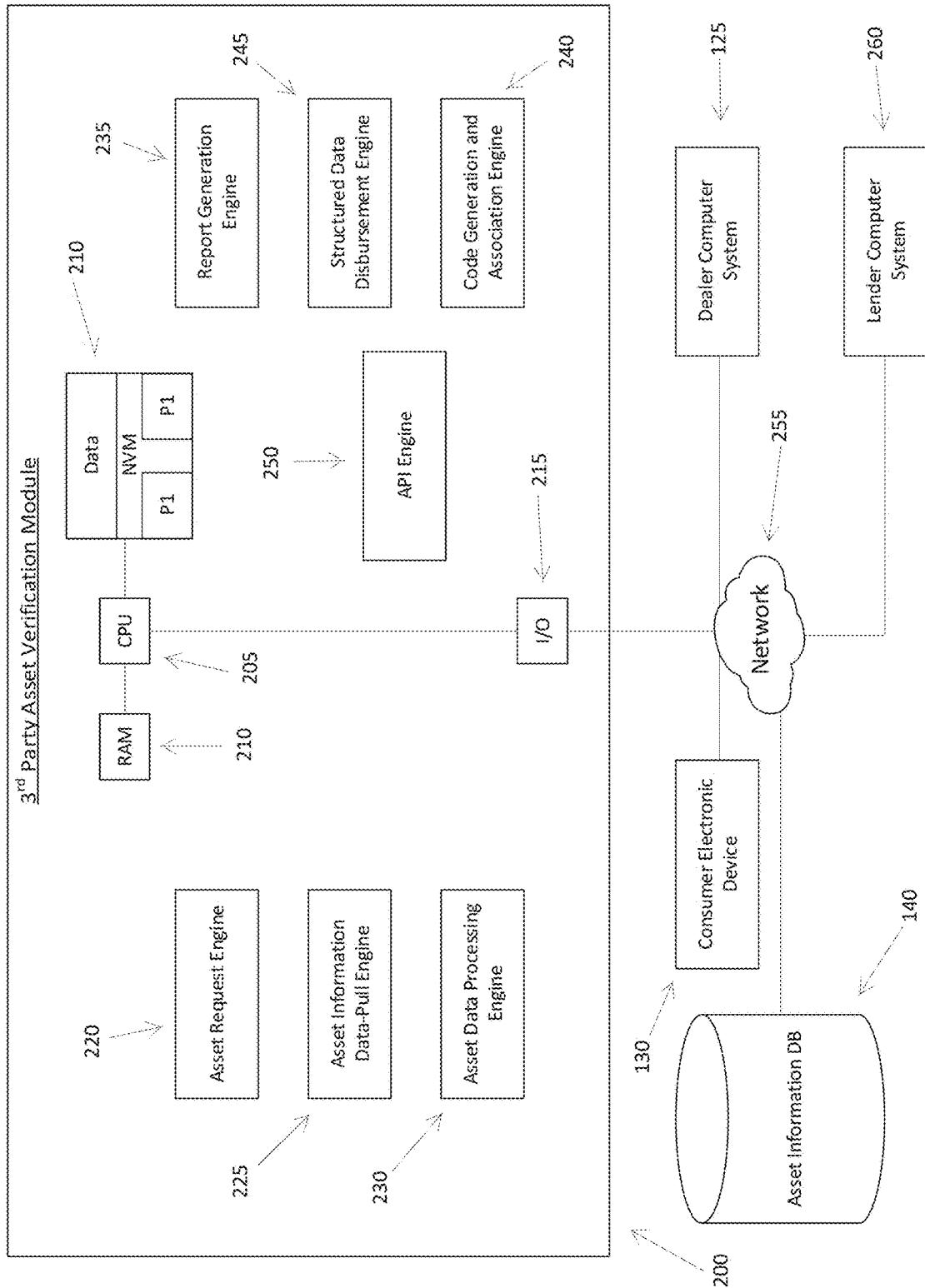
FIG. 2 depicts a block-diagram view of an exemplary 3PAV module and its constituent parts, along with various components that interface with the 3PAV module.

FIG. 2 depicts a block-diagram view of an exemplary 3PAV module and its constituent parts, along with various components that interface with the 3PAV module. A 3PAV module 200 includes at least one processor 205 (e.g., CPU). The 3PAV module includes memory 210 (e.g., volatile memory such as RAM, and non-volatile memory NVM). The NVM may contain program instructions (e.g., P1, P2) that when executed by the processor, cause the processor to perform functions to perform asset verification operations. The 3PAV module includes an input/output (I/O) 215. In some examples, the I/O may include a keyboard, a mouse, and/or a display screen. In various embodiments, the I/O may include a network port configured to connect to a network. In various examples, the I/O may include a wireless communication device.

The 3PAV module includes multiple engines that power the various functions of the 3PAV module. The various engines of the 3PAV module may be entirely automated, advantageously providing for increased speed and reliability versus manual (human) asset verification/underwriting. An asset request engine 220 may receive a request from a seller of goods to access the consumer's asset data. In response, the asset request engine may send a request to a consumer (via the consumer's electronic device 130) asking the consumer for permission to access the consumer's asset information. Once a consumer has given permission to access the consumer's asset information, an asset data-pull engine 225 may communicate with a remote asset information database 140 that stores the asset data of the consumer, such that the asset data-pull engine extracts consumer asset information from the asset database. The extracted consumer asset information may be stored in the NVM of the 3PAV module.

An asset data processing engine 230 may perform various processing steps on the extracted consumer asset information. For example, the asset data processing engine may properly format the extracted consumer asset information, may derive various metrics from the extracted consumer asset information, may validate/error check the extracted consumer asset information, and/or may organize/structure the extracted consumer asset information (e.g., from an unstructured data format to a structured data format). A report generation engine 235 may generate a unique (PDF) report based on the processed consumer asset information generated by the asset data processing engine.

In some examples, various data points may be included in the data file, and various processing steps may be applied to the data. For example, data points may include net income and/or net deposits. Net income and/or net deposits could be calculated to match disparate lenders policies. For example, Lender 1 may "gross up" net income by multiplying the net income by 125%, while Lender 2 may gross up net income by using a factor of 130%. In this sense, generated reports may be custom tailored to the various wants/needs of each lender (e.g., the reports may be ordered "al a carte" with certain features, advanced analytics, etc.). Various computations may be performed on the data, such as searching or aggregation. The output of reports may provision other "alternative data" (e.g., non-bank account data) and provide it with the report (e.g., data such as soft FICO score, credit data, advanced identity checks, liens and judgement data, subprime credit reports, etc.).

A code generation and association engine 240 may generate a unique consumer code associated with and linked to a specific consumers asset information. The code may be used as an access key that allows the holder of the code to gain access to the specific consumer's asset information. For example, the specific consumer's asset information may be encrypted, and the code may be a decryption key that can be used to decrypt the encrypted consumer asset information. The code generation and association engine may send the unique consumer code to an authorized seller of goods/lender. In some examples, the code generation and association engine may send the unique consumer code to the authorized seller of goods, who may then distribute to the code to lenders. In this sense, the code generation engine may perform code assignment to a specific consumer's banking information and controls access to that information.

A structured data disbursement engine 245 may deliver structured (or semi-structured) data to a seller of goods computer system 125, and/or lender computer system 260. For example, the structured data disbursement engine may send structured asset data associated with the consumer to a dashboard displayed on the seller of goods computer system. The structured data disbursement engine may, for example, distribute the consumer's asset data to the seller of goods (e.g., in a read-only PDF "ability to pay" report) having the last three months (or 90 days) of bank statement history. The structured data disbursement engine may, for example, output a structured XML/JSON file and send it to a lender (or lenders). In some examples, the structured data disbursement engine may only distribute a consumer's structured asset data to a seller of goods/lender in possession of the specific consumer's unique consumer code. For example, the lender computer system may have a 3PAV module interface that allows for a code to be submitted to the 3PAV module. In response to receiving a valid code, the structured data disbursement engine may transmit the consumer's structured asset data. An API engine 250 may facilitate interfacing of the 3PAV module with various other computer system (e.g., the seller of goods or lender computer systems). For example, the lender computer system may make a call to the 3PAV module API with a unique consumer code, and in response, the 3PAV module may transmit the consumer's asset data associated with the unique consumer code.

In various examples, the various engines may be program instructions that are stored on the NVM. In some embodiments, the consumer device may be a smartphone device. In various embodiments, the structured data may be in PDF, XML, or JSON format. The transmission of data in the above process may be accomplished via a network 255 (e.g., the Internet). In some examples, the 3PAV module may be employed where a consumer has a lower quality credit score (e.g., less than 660).

Figure 3:
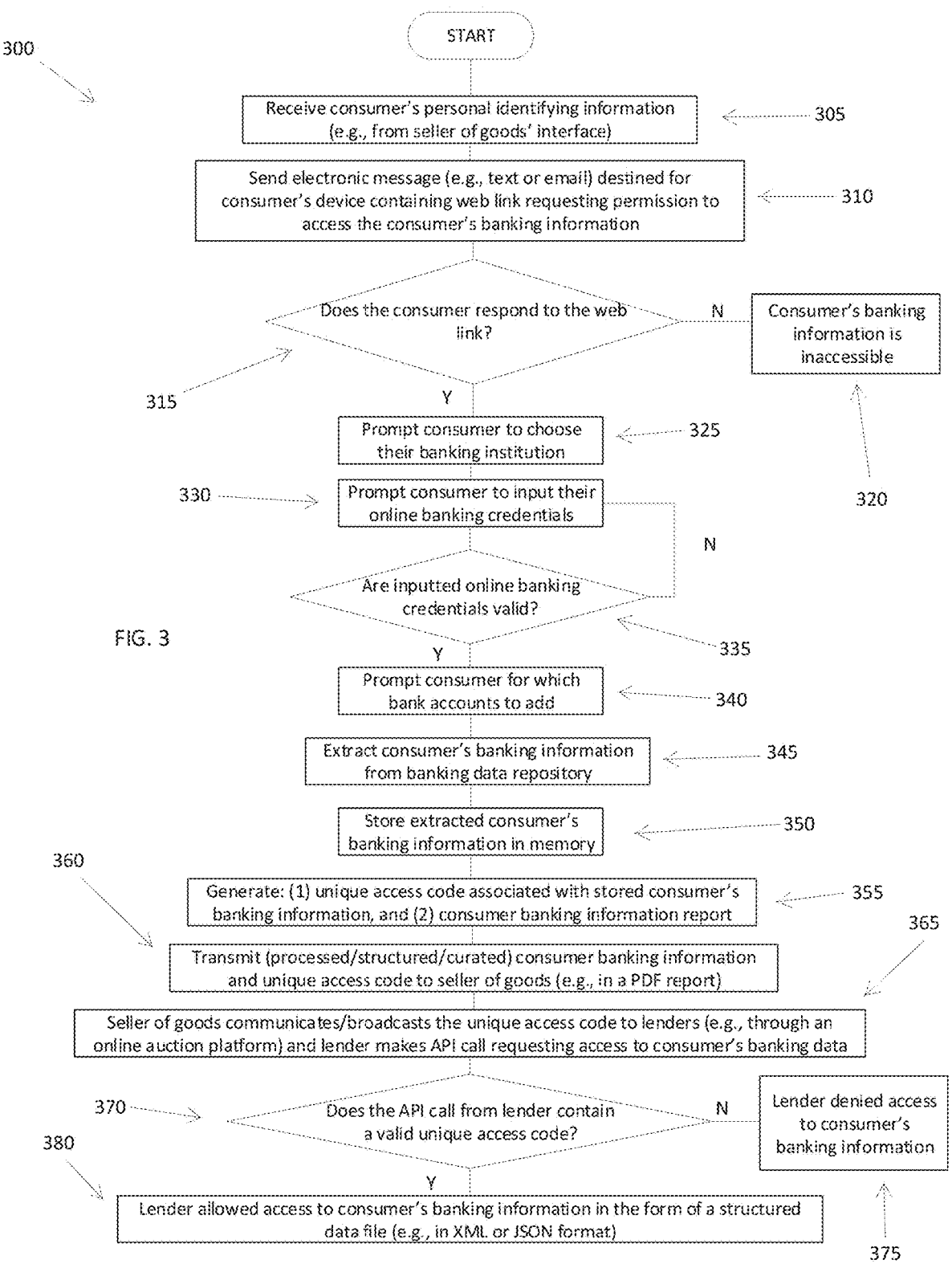
FIG. 3 depicts a flowchart of an exemplary asset verification process.

FIG. 3 depicts a flowchart of an exemplary asset verification process. An asset verification process 300 starts (at 305) with a 3PAV module receiving a consumer's personal identifying information that has been submitted, for example, using a seller of goods' (online web) interface. In response (at 310), the 3PAV module sends an electronic message (e.g., text message) destined for the consumer's device, where the electronic message contains a (web) link requesting permission to access the consumer's banking information. At this point (at 315), the consumer may decide to move forward with the asset verification process or not. If the consumer decides not to move forward with the asset verification process (e.g., the consumer does not respond to the web link), then the consumer's banking information is inaccessible by the 3PAV module (at 320).

If the consumer decides to move forward with the asset verification process (e.g., the consumer responds to the web link), the 3PAV module then prompts the consumer (via a web interface) to choose their banking institution (at 325). Next, the 3PAV module prompts the consumer to input their online banking credentials associated with their banking institution (at 330). Next (at 335), if the inputted online banking credentials are not valid, then the 3PAV module (again) prompts the consumer to input their online banking credentials. If the inputted online banking credentials are valid, then the 3PAV module accesses the consumer's online banking accounts and prompts the consumer for which bank accounts to add (at 340). After the consumer selects which of their bank accounts they would like to add, the 3PAV module then extracts (at 345) the consumer's banking information from the banking data repository (e.g., the banking information DB of the banking information storage entity shown in FIG. 1).

Next, the 3PAV module stores (at 350) the extracted consumer's banking information in memory. The 3PAV module then generates (1) a unique access code associated with the stored consumer's banking information, and (2) a consumer banking information report (at 355). Next, the 3PAV module transmits the (processed/structured/curated) consumer banking information (e.g., in the form of the consumer banking information report) to the seller of goods, along with the unique access code associated with the consumer's banking information (at 360). On the seller of goods' side (at 365), the seller of goods communicates/ broadcasts the unique access code to prospective lenders (e.g., through an online auction platform). In response to receiving the unique access code, a given lender makes an API call requesting access to the consumer's banking data. At 370, if the API call from the lender does not contain a valid unique access code associated with the consumer's banking information, then the lender is denied access to the consumer's banking information. If the API call does contain a valid unique access code, then (at 380) the lender is allowed to access the stored consumer's banking information in the form of a structured data file (e.g., an XML or JSON file). With the (reliable/accurate/trustworthy) consumer's banking information in hand, the lender may then offer bids to purchase the chattel paper associated with the goods the consumer is purchasing from the seller of goods on credit.

In an illustrative example, the once the consumer authenticates their online banking credentials, the seller of goods is able to view an output report (in PDF format). The output report may contain the unique access code that corresponds to the consumer. The seller of goods may then "copy and paste" the unique access code into a predetermined field in an online auction platform to broadcast the code to one or more lenders. After receiving the broadcasted code, Lender 1's computer system may recognize the code and (automatically) make an API call to the 3PAV module requesting a data file containing the consumer's banking information (to enhance the Lender 1's underwriting decision). In response to a valid API call, the 3PAV module may recall the consumer's banking information and deliver it to Lender 1, for example, in Lender 1's preferred format (e.g., an XML or JSON file). The consumer's banking information captured from the consumer's banking source could also be combined with other "alternative data" (e.g., identity/lien/ judgment/credit data). In some embodiments, lenders may be able to choose (e.g., include or exclude) certain data points or metrics in their requested data file (e.g., order a consumer's data "ala carte").

Figure 4:
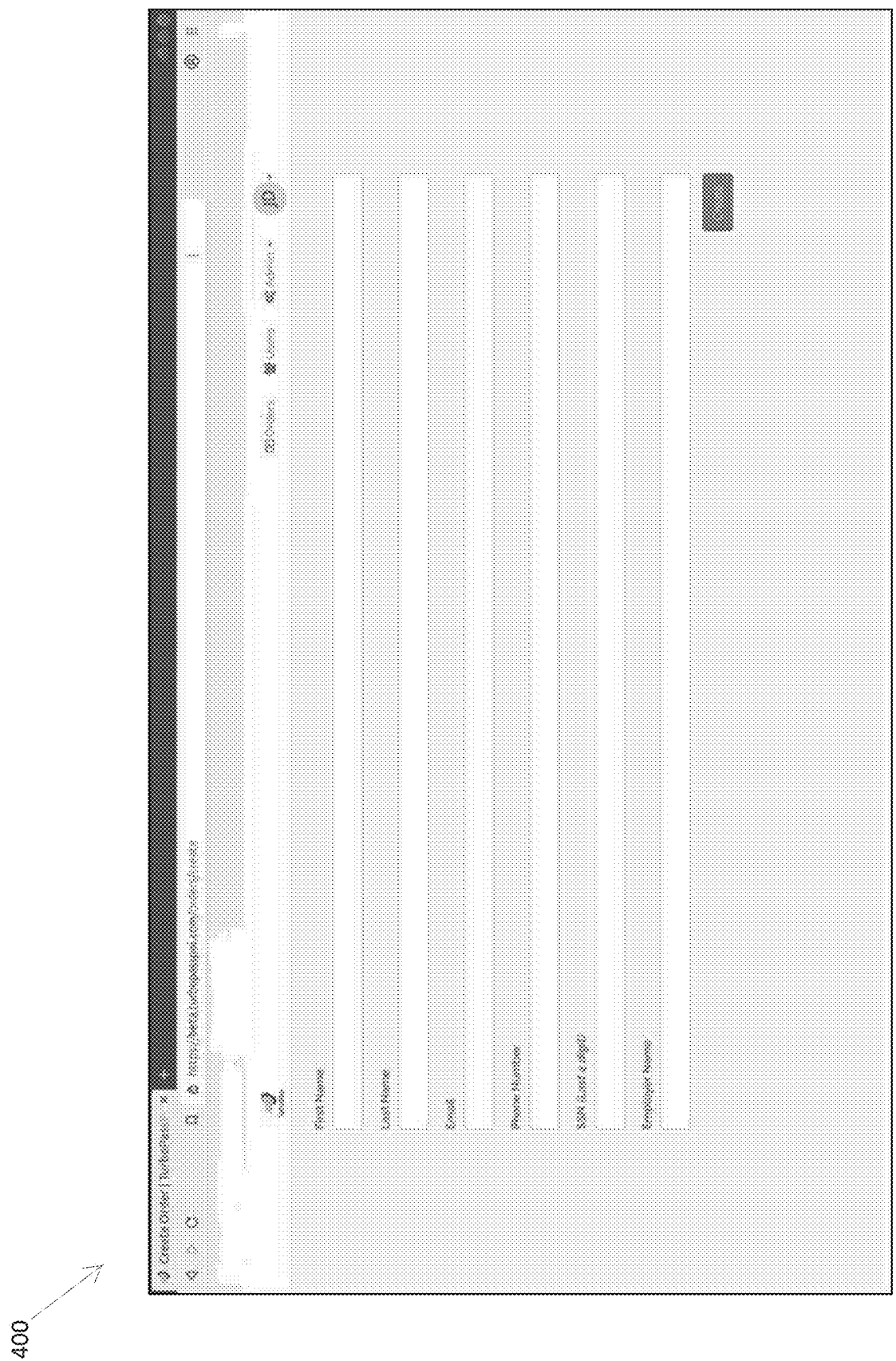
FIG. 4 depicts a display screen including an exemplary graphical user interface (GUI) configured to interface with a user.

FIG. 4 depicts a display screen 400 including an exemplary graphical user interface (GUI) configured to interface with a user. In this exemplary depiction, a first user may be a seller of goods, such as automobiles, for example. The first user may input their information when creating a new order/transaction.

Figure 5:
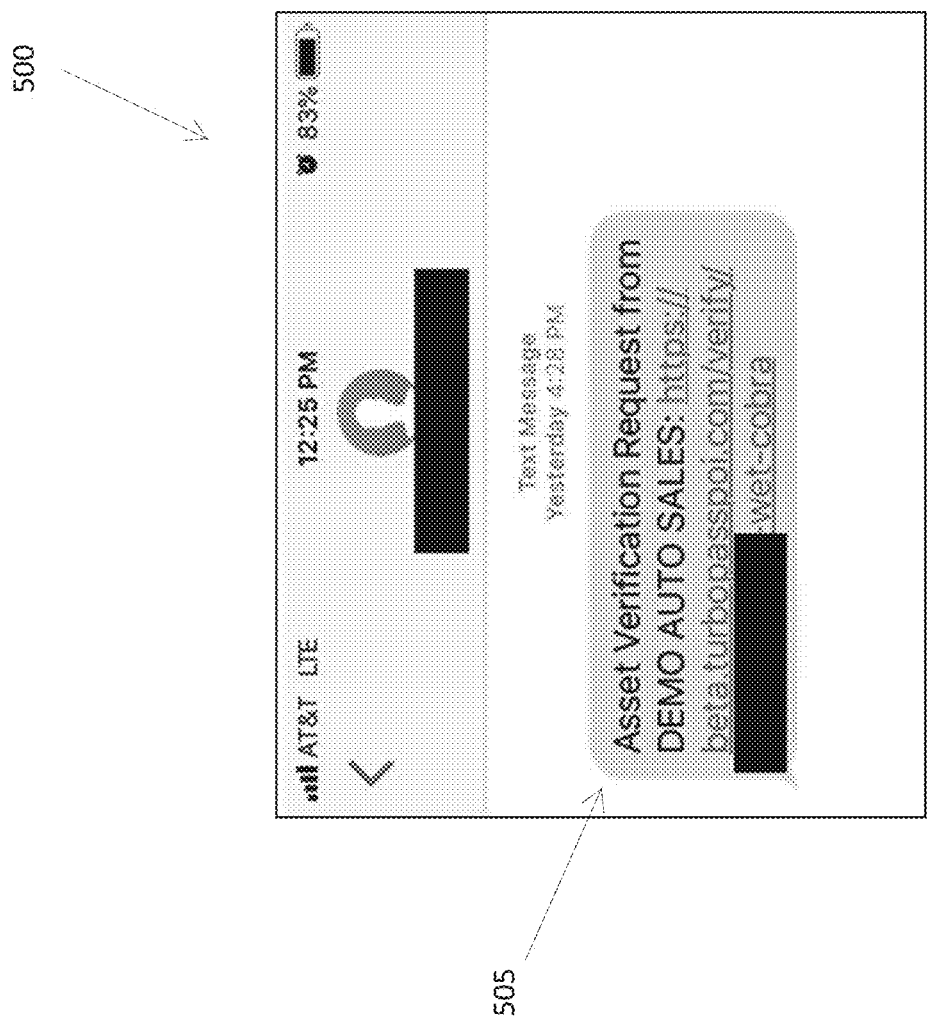
FIG. 5 depicts a display screen including an exemplary graphical user interface (GUI) configured to interface with a user.

FIG. 5 depicts a display screen 500 including an exemplary graphical user interface (GUI) configured to interface with a user. In this exemplary depiction, a second user may be a consumer, such as automobile purchaser, for example. The user interface depicts an electronic (text) message 505 displayed on the second user's electronic device (e.g., a smartphone), the message including a link to a website where the second user may authorize controlled and selective access to the second user's information (e.g., asset, employment, and/or credit information).

Figure 6:
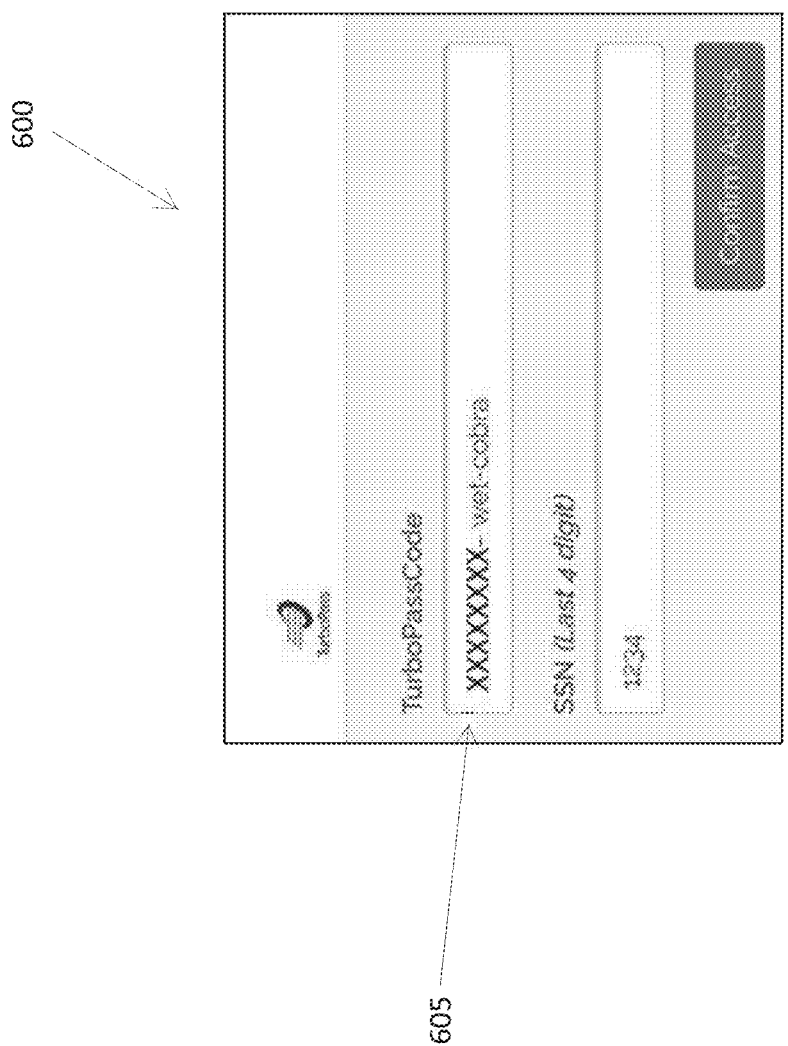
FIG. 6 depicts a display screen including an exemplary graphical user interface (GUI) configured to interface with a user.

FIG. 6 depicts a display screen 600 including an exemplary graphical user interface (GUI) configured to interface with a user. When a second user gives authorization for access to the second user's information, a system may generate a code 605 (TurboPassCode) that allows user's access to the second user's information. For example, a $3^{rd}$ party asset verification module (3PAV module) tangibly embodied in a computer system may generate unique access code associated with the second user's information, which may allow parties (e.g., the second user, the first user the seller of goods or a lender) to access the second user's information through the 3PAV module. An exemplary 3PAV module is described with reference to U.S. App. Ser. No. 62/639,673, titled "Consumer-Authorized Controlled Distribution of Trusted Source Data," filed by Kenneth Jarman, et al., on Mar. 7, 2018, the entire contents of which is hereby incorporated by reference. A user may select "Confirm Access" to validate a unique code to gain access to the second user's information via the 3PAV module. One the second user confirms their information, they may be presented with a message indicating their have successfully linked their account.

Figure 7:
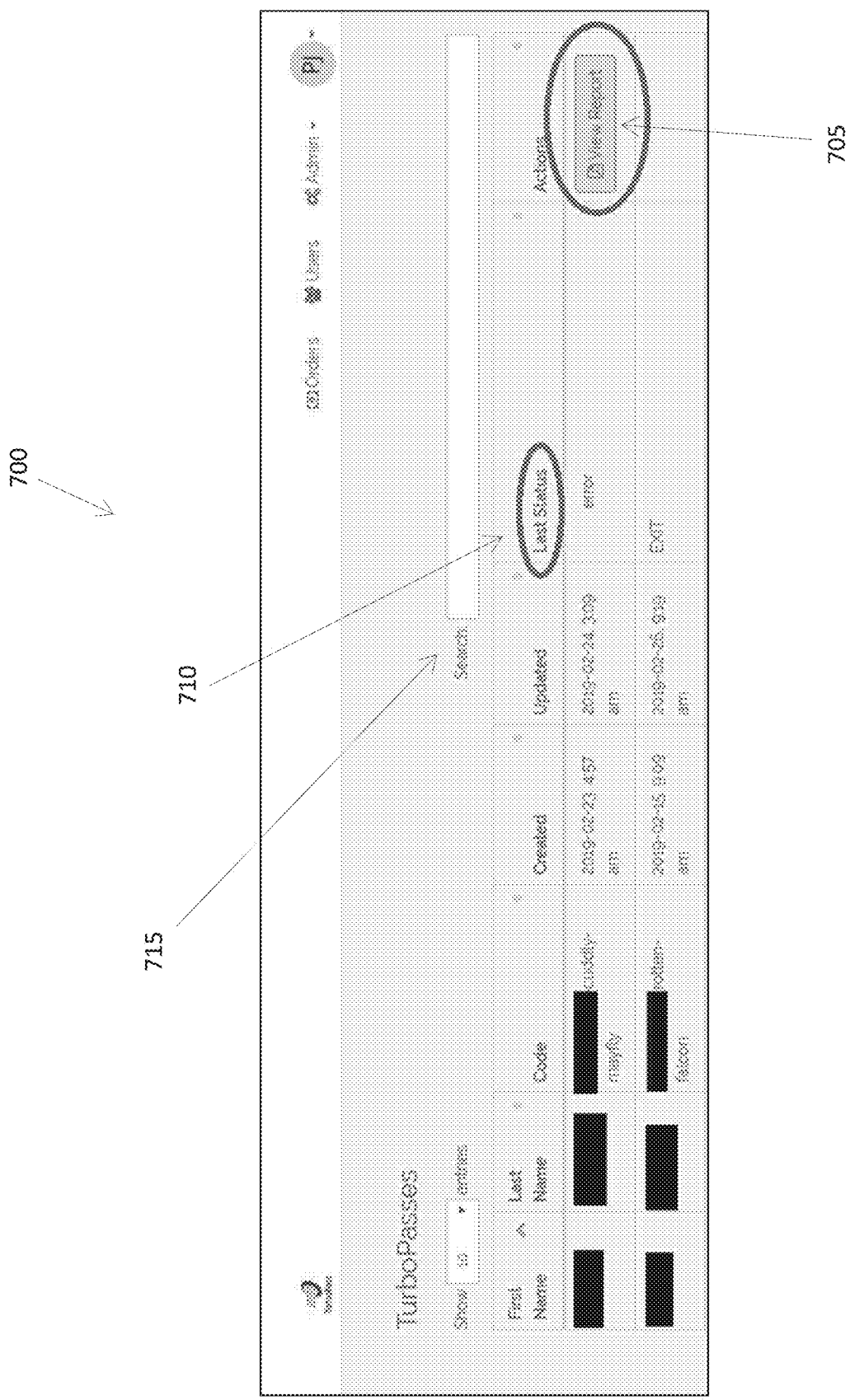
FIG. 7 depicts a display screen including an exemplary graphical user interface (GUI) configured to interface with a user.

FIG. 7 depicts a display screen 700 including an exemplary graphical user interface (GUI) configured to interface with a user. Once the second user has given authorization for access to the second user's information by other parties, a user interface may be available and displayed to the (first) user. The interface may include selection 705 for "View Report," that when selected, may cause an information report associated with the second user's information to be downloaded by the electronic device of the (first) user. In some examples, the information report may be displayed on the (first) user's electronic device. The user interface may also indicate 710 where the first user is in the asset verification process. A search box 715 may allow for searching of different users.

Figure 8:
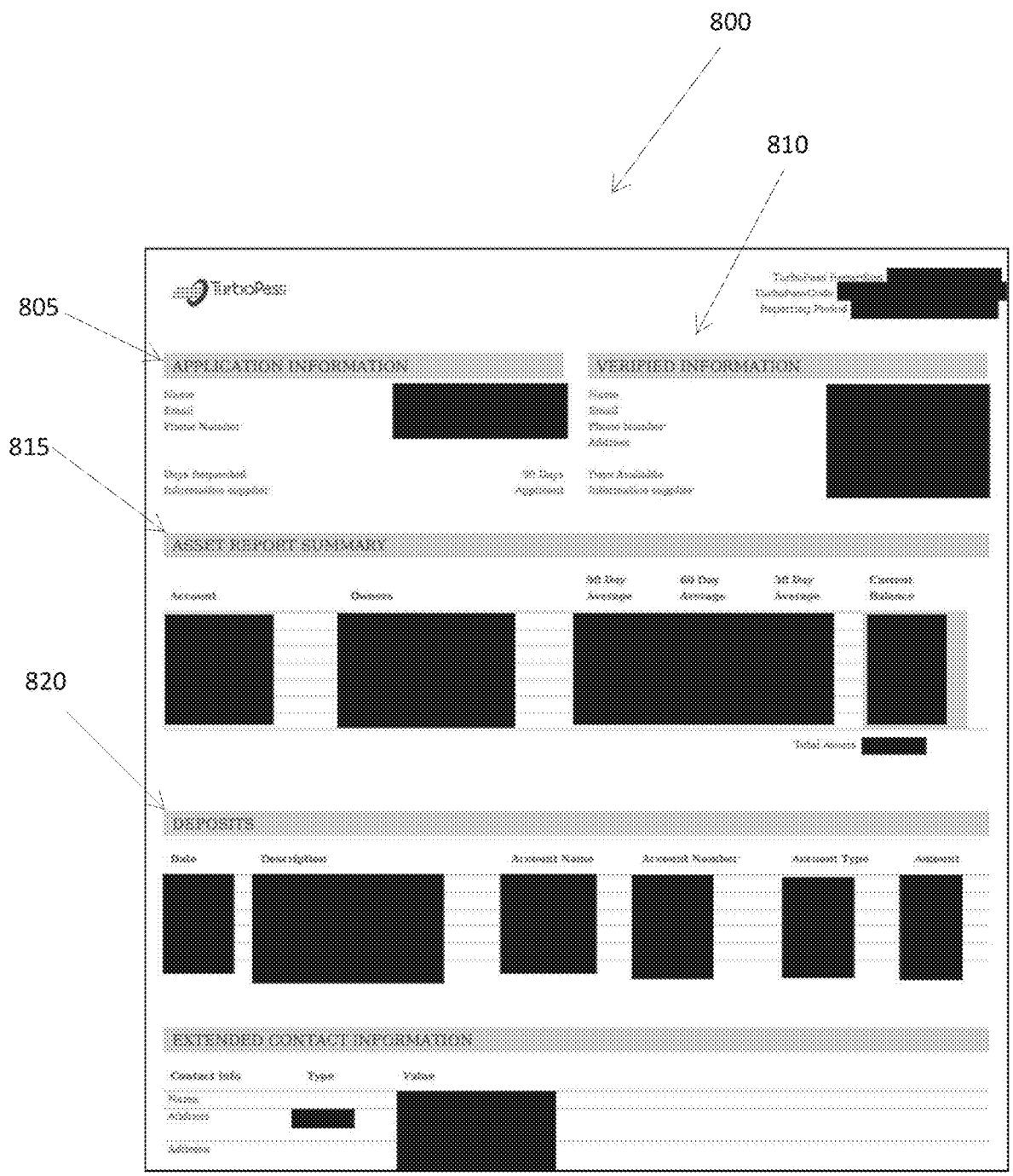
FIG. 8 depicts a display screen including an exemplary graphical user interface (GUI) configured to interface with a user.

FIG. 8 depicts a display screen 800 including an exemplary graphical user interface (GUI) configured to interface with a user. This screen depicts an exemplary information report associated with the second user, which may be displayed on a user's electronic display device in response to selection of "View Report," for example. The report may include various metrics, data, and/or parameters associated with the second user. For example, the report may contain a section 805 for summarizing an applicant's (second user's) information. The report may include verified information 810. The report may include, for example, an asset report summary 815 showing various parameters associated with the user's (financial) information. The report may include, in some implementations, a deposits section 820 indicating various parameters associated with the various deposits of the second user (in the second user's asset accounts, for example). In some embodiments, a report may include other information (e.g., the unique code, a reporting period, verified user information). The report may be accessible over a network, for example, by a third user, who may be a lender user participating in an (electronically operated) automobile lending auction system, and who may have access to the second user's information by virtue of having possession of the unique code associated with the second user's information. The third user may provide the unique code to a 3PAV module, which upon verification of validity of the unique code, may allow access to the second user's information (as graphically shown in the information report).

Figure 9:
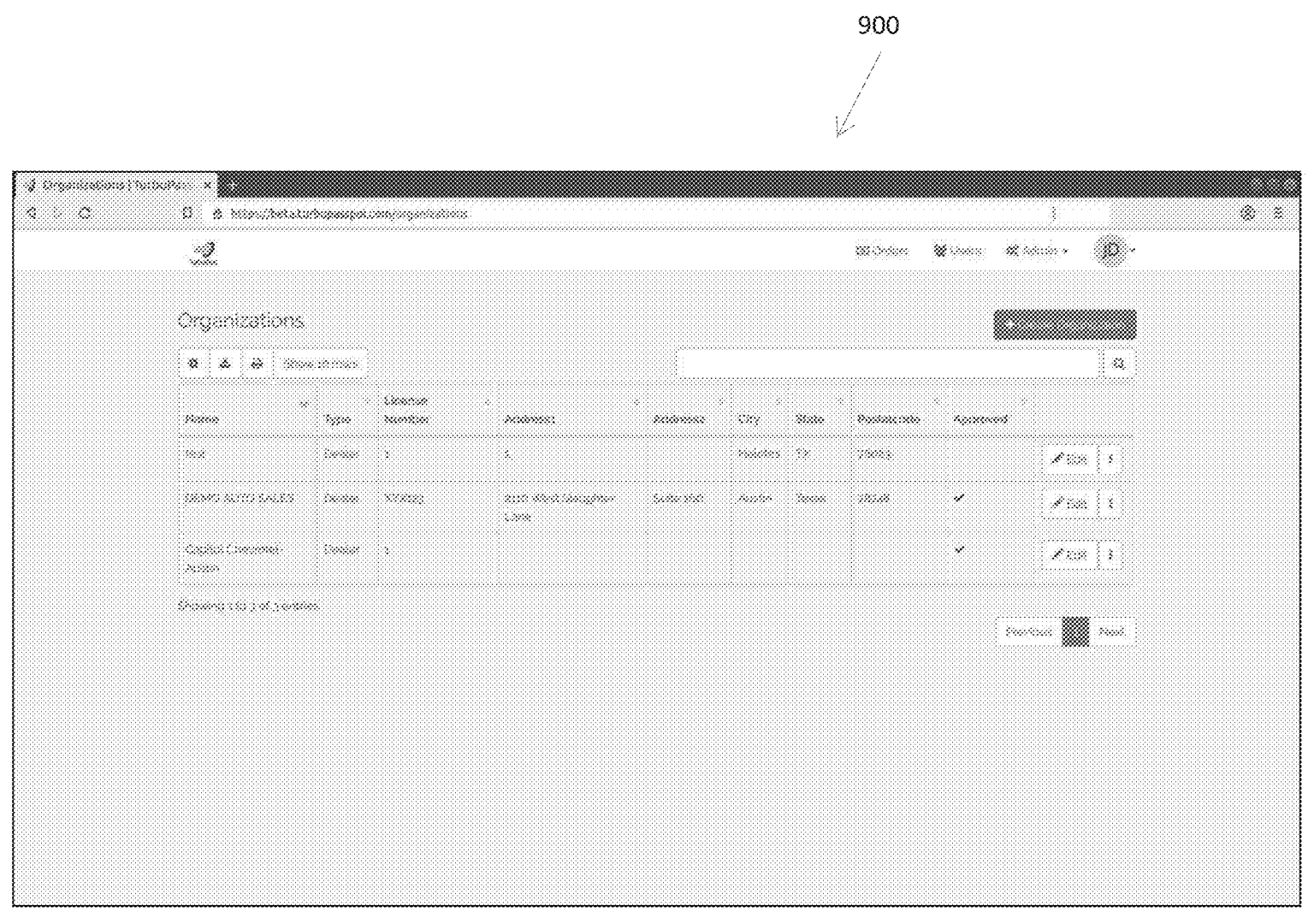

FIG. 9 depicts a display screen 900 including an exemplary graphical user interface (GUI) configured to interface with a user. As shown under the "Organizations" heading, a user interface may include a list of organizations and parameters associated with each organization. An organization may be a user that utilizes the functions, systems, and methods of a 3PAV module for selective and controlled access to a user's information (e.g., as shown in the report described above). In this case, an organization may be a seller of goods, such as automobiles, for example. The depicted interface may allow for administrative overview of users of the functions, systems, and methods of a 3PAV module.

Figure 10:
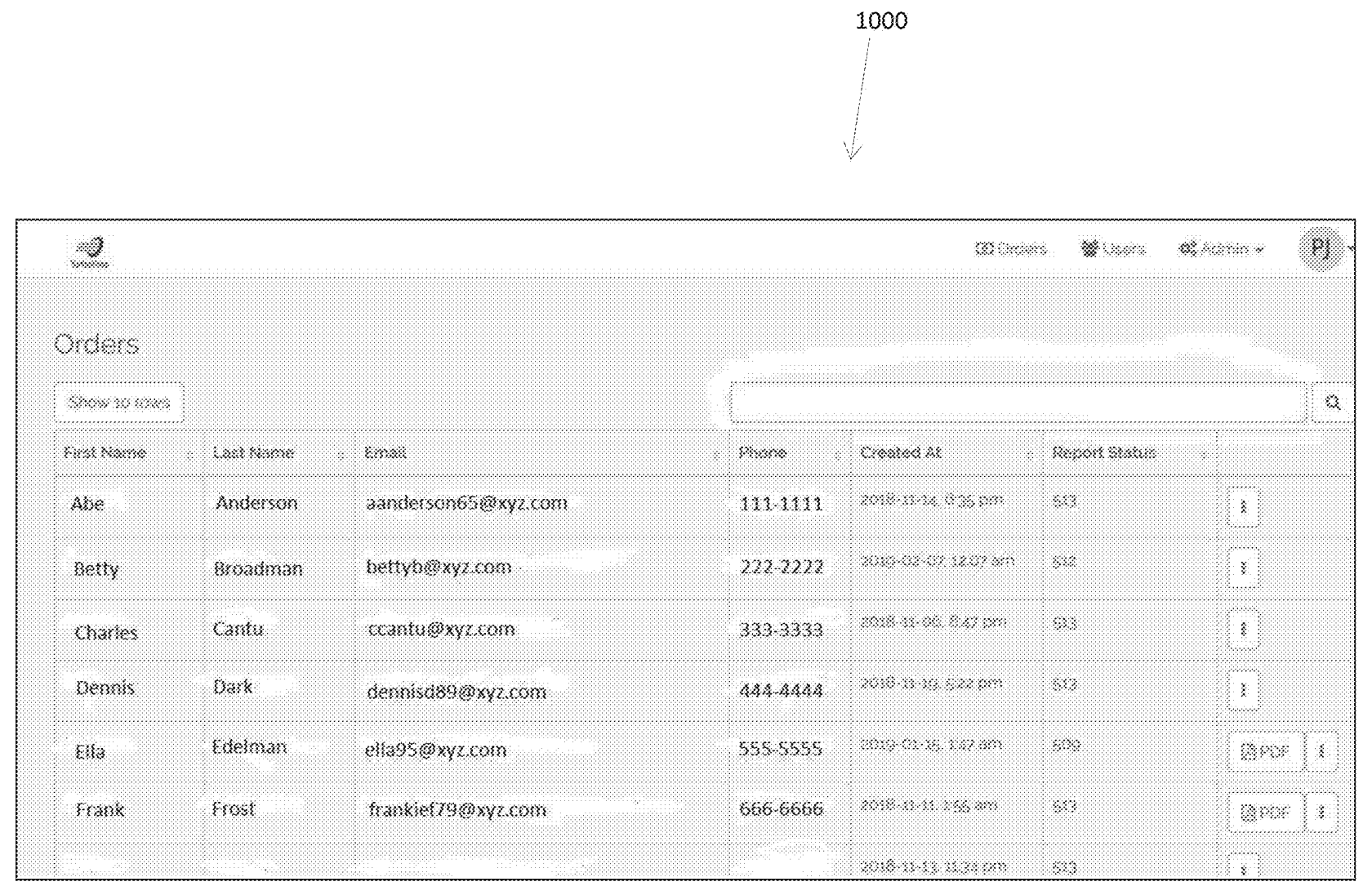

FIG. 10 depicts a display screen 1000 including an exemplary graphical user interface (GUI) configured to interface with a user. As shown under the "Orders" heading, a user may input a unique code to validate an information report associated with the second user. For example, a second user (e.g., a consumer) in possession of the unique code associated with the second user's information may enter the premises of a first user (e.g., an auto dealership). The second user may then transmit or communicate the unique code to the first user, which may then allow the first user to access the second user's information (as contained in the information report) over a network via the 3PAV module. This controlled information access method may advantageously (1) prevent the first party from taking in a fraudulent report, and (2) allow the second user to selectively distribute the second user's information (via the second user's information report) in a controlled and secure fashion.

FIG. 11 depicts a display screen 1100 including an exemplary graphical user interface (GUI) configured to interface with a user. As shown under the "Users" heading, a list of current users of the 3PAV functions, systems, and operations, along with the various parameters associated with the users.

Although various embodiments have been described with reference to the Figures, other embodiments are possible. For example, lenders may use a 3PAV module having access to a consumer's bank statements to prove a (self-employed) consumer's income and/or assets. The 3PAV module may be highly suited to accurately prove up and report on income/assets for a consumer having unique financial history (e.g., a consumer operating in the "gig economy" with multiple side deals and sources of income (such as W2 income or child support income)). For example, a consumer's stated income may be inaccurate or misleading. If a consumer's FICO is high enough, they can be unemployed and yet still have assets. Accordingly, the 3PAV module will true up a given consumers real ability to pay (e.g., income AND assets).

A consumer's "ability to pay" may be how much money they make each month (e.g., pure income). The 3PAV module may bring new insights into a given consumer's ability to pay by having direct access to the consumer's banking data (e.g., average balance, residual cash flow, deposits). Furthermore, the lenders may be confident that a given consumer's bank data they are being provided with via the 3PAV module is accurate and reliable, as it is coming from a trusted third party source.

In some examples, a consumer may give permission to the 3PAV module to pull the last 90 days of the consumer's banking information. The functionality provided by the 3PAV module may be used by any (auto) seller of goods or any (auto) lender, and may provide interactive dashboards for both sellers of goods and lenders to view the consumer's banking information. The 3PAV module may advantageously allow for financing to be provided to a consumer synchronously at the time the consumer is applying for financing for a product offered by a seller of goods. Accordingly, the 3PAV module may allow for a new and useful technological solution for controlling data sources and communicating data between multiple parties in a consumer/seller of goods/lender transaction.

In some examples, a unique consumer code may be included in the (PDF) report sent to the seller of goods by the 3PAV module. The seller of goods may copy the unique consumer code and send it (e.g., via email) to lenders so the lenders can interface with the 3PAV module to access the consumer's banking/asset information. The seller of goods may, for example, copy the code from the (PDF) report and then paste the code in a field of an auction platform, so that prospective lenders on the auction platform can use the code to access a specific consumer's banking/asset information. Accordingly, the auction platform may include standard auction output plus the code that is communicated from the seller of goods to the lender In some examples, lenders may have access to a consumer's asset/banking data via an interactive dashboard, as well as a raw structured data file. In various examples, a (PDF) report of a consumer's banking/asset data may have an appearance similar to a bank statement. The (PDF) report may have the same format regardless of the banking institution of the consumer.

Different lenders may have different ways of processing data. For example, Lender A may multiply net income by 120% to arrive at gross income, while Lender B may multiply net income by 125% to arrive at gross income. In various embodiments, lenders may create their own custom profiles and share with the 3PAV module, such that the 3PAV module sends a customized output to each lender based on the given lender's data preferences. In some examples, a "stability factor" may be the consumer's home address listed on the consumer's bank statements, which may be used to prove residency for a lender. The stability factor may be a parameter that can be customized by each lender, so that lenders who want to see the stability factor can have that information included in the structured consumer's data file. Automatically providing the stability factor to the lenders may advantageously provide for a faster and easier way for lenders to verify the residency of a given consumer.

In various embodiments, a deposit on a consumer's bank statement may have an associated meta tag (e.g., a verified employer meta tag, verified social security income meta tag, child support meta tag). These meta tags may be used to customize which data is sent to a seller of goods/lender. For example, the 3PAV module may only send specific data that applies to specific lender to that lender. In some embodiments, the 3PAV module may transmit other financially-pertinent data that includes, for example, the number of repossessions (repos) of the consumer, or the consumer's judgments/liens. The 3PAV module may selectively transmit this additional financially-pertinent data to a given lender, based on the lender's data preferences. Depending on which lender/seller of goods is requesting the given consumer's data, the specific lender/seller of goods will receive the data they want out of it (e.g., a custom filter separate from the consumer's unique code). In this sense, the consumer's banking/asset information transmitted by the 3PAV module may be customized for a specific seller of goods/lender.

A "curated" data file or report may be a data file or report that is custom tailored to the preferences of a given lender. For example, some lenders may desire lien/judgment data for consumers, while other lenders may not. So a 3PAV module may report lien/judgment data to lenders who desire that data, while withholding lien/judgment data for lenders who do not desire that data. In various examples, each generated report may include a unique access code, with each code being associated with a specific consumer's banking/financial data. A consumer may authenticate their own bank account, which may allow for a seller of goods/lenders to see the consumers cashflow for the last 90 days, for example. In various examples, the various functions of a web link, web page, web interface, or web application may be performed by a computer program (e.g., a smartphone application or APP) being executed locally on a consumer's computing device (e.g., a smartphone).

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A computer program product (CPP) comprising a program of instructions tangibly embodied on a non-transitory computer readable medium wherein, when the instructions are executed on a processor, the processor causes operations to be performed for controlled distribution of trusted source data, the operations comprising:
   receiving, over a network, an initial electronic request to access electronically-stored resource capacity data of a user stored on a controlled-access data storage device;
   in response to receiving the initial electronic request to access, transmitting, over the network to an electronic device of the user, an electronic request for authorization to access the user's resource capacity data;
   receiving, via the network, an electronic authorization transmitted from the electronic device of the user, that authorizes access to the user's resource capacity data;
   in response to receiving the electronic authorization, providing a unique access code that provides access to the electronically-stored resource capacity data of the user;
   transmitting, over the network, the unique access code to an electronic device of a first entity for transmission to a second entity;
   receiving, from an electronic device of the second entity, a second electronic request to access the electronically-stored resource capacity data of the user, the second electronic request including a request code transmitted to the second entity by the first entity;
   determining whether the request code matches the unique access code;
   if the request code matches the unique access code, then granting access to the electronic device of the second entity to electronically read the electronically-stored resource capacity data of the user from the controlled-access data storage device; and,
   if the request code does not match the unique access code, then denying access to the second entity to electronically read the electronically-stored resource capacity data of the user from the controlled-access data storage device.

2. The CPP of claim 1, further comprising:
   transmitting, to the electronic device of the user, a prompt message that prompts the user to input their resource identifying credentials.

3. The CPP of claim 1, further comprising:
   displaying, on an electronic display device, a graphical user interface (GUI) that displays at least a portion of the electronically-stored resource capacity data of the user.

4. The CPP of claim 1, further comprising:
   generating an electronic report that includes at least a portion of the electronically-stored resource capacity data of the user.

5. The CPP of claim 1, wherein providing a unique access code that provides access to the electronically-stored resource capacity data of the user comprises configuring a predetermined unique code to provide access to the electronically-stored resource capacity data of the user.

6. The CPP of claim 1, wherein providing a unique access code that provides access to the electronically-stored resource capacity data of the user comprises generating a unique access code that provides access to the electronically-stored resource capacity data of the user.

7. A computer program product (CPP) comprising a program of instructions tangibly embodied on a non-transitory computer readable medium wherein, when the instructions are executed on a processor, the processor causes operations to be performed for controlled distribution of trusted source data, the operations comprising:

in response to an initial electronic request to access electronically-stored resource capacity data of a user stored on a controlled-access data storage device, transmitting, over a network to an electronic device of the user, an electronic request for authorization to access the user's resource capacity data stored on a controlled-access data storage device;

in response to an electronic authorization from the electronic device of the user and authorizing access to the user's resource capacity data, providing a unique access code that provides access to the electronically-stored resource capacity data of the user;

transmitting, over the network, the unique access code to an electronic device of a first entity for transmission to a second entity;

receiving, from an electronic device of the second entity, a second electronic request to access the electronically-stored resource capacity data of the user, the second electronic request including a request code transmitted to the second entity by the first entity;

determining whether the request code matches the unique access code; and, if the request code matches the unique access code, then granting access to the electronic device of the second entity to electronically read the electronically-stored resource capacity data of the user from the controlled-access data storage device.

8. The CPP of claim 7, wherein the resource capacity data of the user comprises income data.

9. The CPP of claim 7, wherein the resource capacity data of the user comprises asset data.

10. The CPP of claim 7, wherein the resource capacity data of the user includes income and asset data.

11. The CPP of claim 7, further comprising:
transmitting, to the electronic device of the user, a prompt message that prompts the user to input their resource identifying credentials.

12. The CPP of claim 7, further comprising:
displaying, on an electronic display device, a graphical user interface (GUI) that displays at least a portion of the electronically-stored resource capacity data of the user.

13. The CPP of claim 7, wherein the operation of transmitting, over the network to the electronic device of the user, the electronic request for authorization to access the user's resource capacity data, comprises transmitting a text message to the electronic device of the user.

14. The CPP of claim 7, wherein providing a unique access code that provides access to the electronically-stored resource capacity data of the user comprises configuring a predetermined unique code to provide access to the electronically-stored resource capacity data of the user.

15. The CPP of claim 7, wherein the second electronic request to access the electronically-stored resource capacity data of the user comprises an application programming interface (API) call.

16. The CPP of claim 7, wherein the initial electronic request to access electronically-stored resource capacity data of a user comprises personal identifying information associated with the user.

17. The CPP of claim 7, wherein the controlled-access electronic data store comprises a remote database.

18. A computer program product (CPP) comprising a program of instructions tangibly embodied on a non-transitory computer readable medium wherein, when the instructions are executed on a processor, the processor causes operations to be performed for controlled distribution of trusted source data, the operations comprising:

in response to an initial electronic request to access electronically-stored resource capacity data of a user, transmitting, over a network to an electronic device of the user, an electronic request for authorization to access the user's resource capacity data stored on a controlled-access data storage device;

in response to an electronic authorization from the electronic device of the user and authorizing access to the user's resource capacity data, providing a unique access code that provides access to the electronically-stored resource capacity data of the user;

transmitting, over the network, the unique access code to an electronic device of a first entity for transmission to a second entity;

receiving, from an electronic device of the second entity, a second electronic request to access the electronically-stored resource capacity data of the user, the second electronic request including a request code transmitted to the second entity by the first entity;

determining whether the request code matches the unique access code; and, if the request code matches the unique access code, then granting access to the electronic device of the second entity to electronically read the electronically-stored resource capacity data of the user from the controlled-access data storage device, wherein the network is the Internet.

19. The CPP of claim 18, further comprising:
displaying, on an electronic display device, a graphical user interface (GUI) that displays at least a portion of the electronically-stored resource capacity data of the user.

20. The CPP of claim 18, wherein the controlled-access electronic data store comprises a remote database.

21. The CPP of claim 18, wherein the second electronic request to access the electronically-stored resource capacity data of the user comprises an application programming interface (API) call.

* * * * *